US011989019B1

(12) United States Patent
Krishnaswamy et al.

(10) Patent No.: US 11,989,019 B1
(45) Date of Patent: May 21, 2024

(54) SYSTEMS AND METHODS FOR DETECTING AND TRANSMITTING DRIVING CONDITION INFORMATION RELATED TO AN AUTONOMOUS VEHICLE

(71) Applicant: United Services Automobile Association (USAA), San Antonio, TX (US)

(72) Inventors: Pooja Krishnaswamy, Cedar Park, TX (US); Victor Kwak, Frisco, TX (US); Huihui Wu, Plano, TX (US); Justin Nash, Little Elm, TX (US); Michael Lebowitz, McKinney, TX (US); William Daniel Farmer, Carrollton, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 158 days.

(21) Appl. No.: 17/039,413

(22) Filed: Sep. 30, 2020

Related U.S. Application Data (60) Provisional application No. 62/908,184, filed on Sep. 30, 2019.

(51) Int. Cl.
*G05D 1/00* (2006.01)
*G01W 1/00* (2006.01)
*G05D 1/02* (2020.01)

(52) U.S. Cl.
CPC ............ *G05D 1/0088* (2013.01); *G01W 1/00* (2013.01); *G05D 1/0257* (2013.01); *G05D 1/028* (2013.01);

(Continued)

(58) Field of Classification Search
CPC .... G05D 1/0088; G05D 1/0257; G05D 1/028; G05D 1/0285; G05D 2201/0213; G01W 1/00

See application file for complete search history.

(56) References Cited

U.S. PATENT DOCUMENTS

| 10,324,463 B1* | 6/2019 | Konrardy ............. G05D 1/0278 |
| 2014/0277831 A1* | 9/2014 | Hunt ...................... G07C 5/008 |
| | | 701/1 |

(Continued)

OTHER PUBLICATIONS

Mitch Thomas, "What Does DBm MEan? How Do I Know If My Signal Strength Is Optimal?", posted Jul. 26, 2017.*

*Primary Examiner* — Jason Holloway
*Assistant Examiner* — Blake A Wood
(74) *Attorney, Agent, or Firm* — Fletcher Yoder, P.C.

(57) ABSTRACT

An autonomous vehicle includes vehicle sensors that detect driving conditions and a communication interface communicatively coupled with a driving condition database via a communication network. The driving condition database stores vehicle sensor information indicative of first driving conditions and mobile device sensor information indicative of second driving conditions. Additionally, in response to a connection rating determination logic determining that a connection rating between the communication interface and the communication network below a threshold, a controller of the autonomous vehicle gathers, processes, and stores the vehicle sensor information and the mobile device sensor information for subsequent communication to the driving condition database and operates the autonomous vehicle based on the vehicle sensor information and the mobile device sensor information.

20 Claims, 4 Drawing Sheets

(52) U.S. Cl.
CPC ... *G05D 1/0285* (2013.01); *G05D 2201/0213* (2013.01)

(56) References Cited

U.S. PATENT DOCUMENTS

| | | | |
|---|---|---|---|
| 2015/0215738 A1* | 7/2015 | Frusina | H04N 21/64738 |
| | | | 455/552.1 |
| 2017/0311249 A1* | 10/2017 | Lopes | H04W 48/10 |
| 2019/0020973 A1* | 1/2019 | Harish | G01C 21/20 |
| 2019/0041225 A1* | 2/2019 | Winkle | G01C 21/3453 |
| 2019/0137999 A1* | 5/2019 | Taguchi | G06V 20/58 |
| 2019/0364492 A1* | 11/2019 | Azizi | H04W 4/029 |
| 2020/0041994 A1* | 2/2020 | Alalao | H04W 4/18 |
| 2020/0043254 A1* | 2/2020 | Hase | B60W 40/02 |
| 2020/0056897 A1* | 2/2020 | Williamson | G01C 21/3602 |

* cited by examiner

SYSTEMS AND METHODS FOR DETECTING AND TRANSMITTING DRIVING CONDITION INFORMATION RELATED TO AN AUTONOMOUS VEHICLE

CROSS-REFERENCE TO RELATED APPLICATION

This application claims the benefit of U.S. Provisional Patent Application No. 62/908,184, entitled "SYSTEMS AND METHODS FOR DETECTING AND TRANSMITTING DRIVING CONDITION INFORMATION RELATED TO AN AUTONOMOUS VEHICLE," filed Sep. 30, 2019, which is incorporated herein by reference in its entirety for all purposes.

BACKGROUND

An autonomous vehicle may be controlled based on an environment in which the vehicle is operating. For example, operation of the vehicle may be managed based on sensed information of the environment (e.g., provided by external sources and communicated to the vehicle) as the vehicle moves through the environment. However, external communications with the vehicle may be interrupted due to a loss of connection or poor connection quality as the vehicle travels (e.g., between different communication coverage areas of the environment), which may affect the ability to properly operate the vehicle. It is now recognized that there is a need for improving the management of the autonomous vehicle as the vehicle moves through a given environment.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

BRIEF DESCRIPTION

Certain embodiments commensurate in scope with the disclosed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In certain embodiments, an autonomous vehicle includes vehicle sensors that detect driving conditions and a communication interface communicatively coupled with a driving condition database via a communication network. The driving condition database stores vehicle sensor information indicative of first driving conditions and mobile device sensor information indicative of second driving conditions. Additionally, in response to a connection rating determination logic determining that a connection rating between the communication interface and the communication network below a threshold, a controller of the autonomous vehicle gathers, processes, and stores the vehicle sensor information and the mobile device sensor information for subsequent communication to the driving condition database and operates the autonomous vehicle based on the vehicle sensor information and the mobile device sensor information.

In certain embodiments, an autonomous vehicle includes vehicle sensors that detect first driving conditions and a communication interface communicatively coupled with a vehicle bus of the autonomous vehicle and a driving condition database via a communication network. The vehicle bus receives vehicle sensor information indicative of the first driving conditions from the vehicle sensors and mobile device sensor information indicative of second driving conditions from one or more mobile devices. The driving condition database is configured to store the vehicle sensor information and the mobile device sensor information. The autonomous vehicle also includes a connection rating determination logic that determines a connection rating of a connection between the communication interface and the communication network and a data gathering and processing logic that gathers and/or processes the vehicle sensor information and the mobile device sensor information. Additionally, the autonomous vehicle includes a controller having one or more processors and one or more memory devices. The one or more processors are configured to execute instructions stored in the one or more memory devices to cause the one or more processors to, in response to the connection rating determination logic determining that the connection rating is below a threshold, instruct the data gathering and processing logic to gather and/or process the vehicle sensor information and the mobile device sensor information and store the vehicle sensor information and the mobile device sensor information gathered and/or processed by the data gathering and processing logic in a storage device of the autonomous vehicle for subsequent communication by the communication interface to the driving condition database. The one or more processors are configured to operate the autonomous vehicle based on the vehicle sensor information and the mobile device sensor information.

In certain embodiments, one or more tangible, non-transitory, computer-readable media, includes instructions for detecting and transmitting driving condition information related to an autonomous vehicle that, when executed by one or more processors, cause the one or more processors to receive vehicle sensor information and mobile device sensor information, where the vehicle sensor information and the mobile device sensor information are indicative of one or more driving conditions. Additionally, the instructions, when executed by the one or more processors, cause the one or more processors to send the vehicle sensor information and the mobile device sensor information to a driving condition database via a communication interface communicatively coupled to the autonomous vehicle in response to determining that a connection rating is a high rating, and store the vehicle sensor information and the mobile device sensor information in a storage device for subsequent communication by the communication interface to the driving condition database in response to determining that the connection rating is a low rating. The connection rating is indicative of a quality of a communicative connection between the communication interface and a communication network.

In certain embodiments, a method of detecting and transmitting driving condition information related to an autonomous vehicle includes receiving vehicle sensor information and mobile device sensor information, where the vehicle sensor information and the mobile device sensor information are indicative of one or more driving conditions. The method also includes determining a connection rating between a communication network and a communication interface configured to communicatively couple with a vehicle bus of the autonomous vehicle, sending the vehicle sensor information and the mobile device sensor information, via the communication interface, to a driving condition database in response to determining that the connection rating is a high rating, and in response to determining that the connection rating is the low rating, processing the vehicle sensor information and the mobile device sensor information and storing the vehicle sensor information and the mobile device sensor information in a storage device for subsequent communication by the communication interface to the driving condition database.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure relates generally to autonomous vehicles, and more particularly to systems and methods for detecting and transmitting driving condition information related to autonomous vehicles. An autonomous vehicle may include vehicle sensors that detect driving conditions (e.g., driving condition information) related to the autonomous vehicle. For example, a communication interface of the autonomous vehicle may receive vehicle sensor information indicative of the driving conditions (e.g., first driving conditions) from the vehicle sensors and/or mobile device sensor information indicative of the driving conditions (e.g., second driving conditions) from a mobile device (e.g., a mobile device disposed in or proximate to the autonomous vehicle). The driving conditions may include weather conditions (e.g., precipitation type, precipitation amount/rate, temperature, humidity, barometric pressure), road conditions (e.g., potholes, road grade, surface traction, surface conditions), road markings (e.g., dashed/solid lane lines, stop lines, lane markings/verbiage), objects disposed proximate to and/or along a pathway of the autonomous vehicle (e.g., animals, rocks, trees, fire hydrants, stop lights, guard rails), other vehicles (e.g., other vehicles moving along the roadway, other vehicles stationary on the roadway and/or to a side of the roadway, other autonomous vehicles, non-autonomous vehicles, emergency vehicles, public transportation vehicles, school vehicles), structures (e.g., buildings), signs (e.g., stop signs, yield signs), municipalities, natural disasters, and other driving conditions that may be useful/instructive for operation of the autonomous vehicle and other vehicles (e.g., other autonomous vehicles, other non-autonomous vehicles).

The communication interface may be communicatively coupled to a driving condition database via a communication network (e.g., a mobile network, a cellular network, an autonomous vehicle network). The driving condition database may store the vehicle sensor information and the mobile device sensor information for subsequent communication to and use by the autonomous vehicle and other vehicles. For example, after gathering and storing the vehicle sensor information and the mobile device sensor information in the driving condition database, the vehicle sensor information and the mobile device sensor information may be subsequently communicated to the autonomous vehicle and the other vehicles, which may use the vehicle sensor information and the mobile device sensor information to control operation of the autonomous vehicle and the other vehicles (e.g., to steer, to control speed, to control windshield wipers, to control communication with the driving condition database, to control communication with other vehicles and/or components of an autonomous vehicle network).

Additionally, the autonomous vehicle may include a data gathering and processing logic that gathers and processes (e.g., manipulates, formats, converts, transforms) the vehicle sensor information and the mobile device sensor information for subsequent communication to the driving condition database. For example, after receiving the vehicle sensor information from the vehicle sensors and the mobile device sensor information from the mobile devices, the data gathering and processing logic may process the vehicle sensor information and the mobile device sensor information to facilitate subsequent communication and use of the vehicle sensor information and the mobile device sensor information. For example, the data gathering and processing logic may process the vehicle sensor information and the mobile device sensor information to generate assessed driving conditions.

Further, the autonomous vehicle may include a connection rating determination logic that determines a connection rating (e.g., based on signal strength or signal noise) of a connection between the communication interface and the communication network. For example, the communication interface may attempt to send signals to and/or receive signals from another communication interface to determine the connection rating. Based on the connection rating being a high rating, a controller of the autonomous vehicle may instruct the communication interface to send (e.g., transmit, communicate) the vehicle sensor information and the mobile device sensor information to the driving condition database. Based on the connection rating being a low rating, the controller may instruct the data gathering and processing logic to gather and process the vehicle sensor information and the mobile device sensor information and may store the gathered and processed vehicle sensor information and mobile device sensor information for subsequent communication by the communication interface to the driving condition database (e.g., when the connection rating is the high rating). As such, the autonomous vehicle may collect, process, and send the driving condition information to the driving condition database when the connection rating is the high rating, and may collect, process, and store the information indicative of the driving conditions when the connection rating is the low rating for subsequent communication to the driving condition database.

In certain embodiments, the autonomous vehicle may download the driving condition information from the driving condition database and/or control an amount of the driving condition information downloaded from the driving condition database based on the connection rating and/or based on an expected connection rating. For example, if the connection rating is the high rating, the autonomous vehicle may download the driving condition information. If the connection rating is the low rating, the autonomous vehicle may continue operating without downloading driving condition information and may subsequently download the driving condition information once the connection rating is the high rating. Additionally, the autonomous vehicle may download and store additional driving condition information (e.g., more driving condition information than would typically be downloaded) when the connection rating is the high rating and the expected connection rating is the low rating. Doing so allows the autonomous vehicle to download and store the driving condition information for areas in which the connection rating is the low rating and/or where the autonomous vehicle would otherwise not be able to download the driving condition information.

In some embodiments, the driving condition information may be crowd-sourced among multiple vehicles. The vehicles may include autonomous vehicles and/or non-autonomous vehicles. Each vehicle may gather, process, and send a particular type of driving condition information or multiple types of driving condition information via sensors. For example, a first vehicle may include vehicle sensors that detect vehicle sensor information indicative of a first driving condition, a second vehicle may include vehicle sensors that detect vehicle sensor information indicative of a second driving condition, a third vehicle may include vehicle sensors that detect vehicle sensor information indicative of a third driving condition, and so forth. Each vehicle (e.g., the first vehicle, the second vehicle, the third vehicle) may send the gathered and/or processed vehicle sensor information (e.g., the driving condition information) to the driving condition database. The driving condition information may accumulate in the driving condition database and may then be communicated to autonomous vehicles via the communication network to allow the autonomous vehicles to be controlled based on the driving condition information. The crowd-sourced driving condition information allows the autonomous vehicles to use the driving condition information gathered by other vehicles even if the autonomous vehicles have never traveled through a particular geographical area, and/or if the autonomous vehicles lack the vehicle sensors that detect the particular driving condition information that is detected by other vehicles.

In certain embodiments, the driving condition information may be used to operate the autonomous vehicle as the vehicle sensor information and the mobile device sensor information is gathered and/or processed. For example, in addition to storing and transmitting the vehicle sensor information and the mobile device sensor information, the autonomous vehicle may be operated while and/or after such information is gathered and processed. Doing so may facilitate operation of the autonomous vehicle when additional/alternative driving condition information is unavailable (e.g., driving condition information from the driving condition database).

Figure 1:
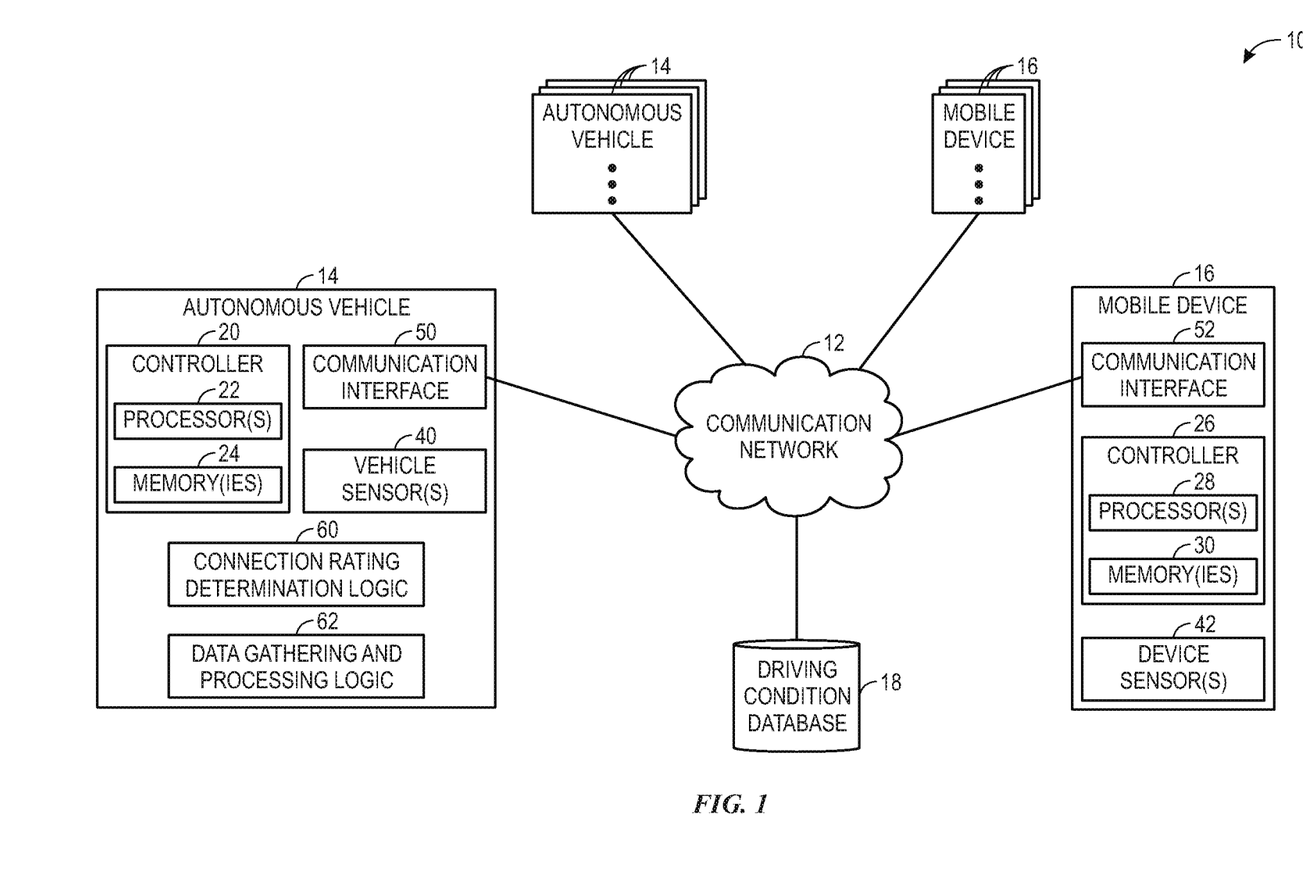
FIG. 1 is a block diagram of an autonomous vehicle network system, according to embodiments of the present disclosure.

With the foregoing in mind, FIG. 1 is a block diagram of an autonomous vehicle network system 10 for facilitating detection of driving condition information and uploading/downloading the driving condition information, according to embodiments of the present disclosure. The autonomous vehicle network system 10 includes a communication network 12, autonomous vehicles 14 communicatively coupled to the communication network 12, mobile devices 16 communicatively coupled to the communication network 12, and a driving condition database 18 communicatively coupled to the communication network 12. The autonomous vehicles 14 and the mobile devices 16 may detect driving condition information via sensors and upload the driving condition information to the driving condition database 18 via communication interfaces and the communication network 12. Additionally, the autonomous vehicles 14 may download the driving condition information from the driving condition database 18 (e.g., the driving condition information previously uploaded by the same autonomous vehicle 14, by other autonomous vehicles 14, and/or by the mobile devices 16). While the illustrated autonomous vehicle network system 10 includes four autonomous vehicles 14 and four mobile devices 16, it should be understood that any suitable number of autonomous vehicles 14 and any suitable number of mobile devices 16 are contemplated.

As described herein, the autonomous vehicles 14 may include any vehicle that operates partially or fully autonomously. Examples of autonomous operations of the autonomous vehicles 14 may include autonomous steering, autonomous control of speed, autonomous control of windshield wipers, autonomous communication with the driving condition database, autonomous communication with other vehicles and/or components of an autonomous vehicle network, and other operations of a vehicle that may be configured for at least partial autonomous operation/control. The autonomous vehicles 14 may include any suitable vehicle, such as an automobile, car, truck, motorcycle, commercial vehicle, recreational vehicle, all-terrain vehicle, boat, airplane, snowmobile, and the like.

In certain embodiments, the autonomous vehicle network system 10 may include non-autonomous vehicle(s) (e.g., vehicles not configured for at least partial autonomous operation) in addition to the autonomous vehicles 14. For example, in addition to the autonomous vehicles 14, the non-autonomous vehicles may collect, process, and/or upload driving condition information to the driving condition database 18 for subsequent download and use by the autonomous vehicles 14.

Each autonomous vehicle 14 may include a controller 20 that includes one or more processors 22 and one or more memory and/or storage devices 24. Additionally, each mobile device 16 may include a controller 26 that includes one or more processors 28 and one or more memory and/or storage devices 30. The one or more processors 22, 28 (e.g., microprocessors) may execute software programs and/or instructions to facilitate uploading and downloading driving condition information. Moreover, the one or more processors 22, 28 may include multiple microprocessors, one or more "general-purpose" microprocessors, one or more special-purpose microprocessors, and/or one or more application specific integrated circuits (ASICS), or some combination thereof. For example, the one or more processors 22, 28 may include one or more reduced instruction set (RISC) processors. The one or more memory devices 24, 30 may store information such as control software, look up tables, configuration data, etc. In some embodiments, the one or more processors 22 and/or the one or more memory devices 24 may be external to the controller 20, and/or the one or more processors 28 and/or the one or more memory devices 30 may be external to the controller 26. The one or more memory devices 24, 30 may include a tangible, non-transitory, machine-readable-medium, such as a volatile memory (e.g., a random access memory (RAM)) and/or a nonvolatile memory (e.g., a read-only memory (ROM)). The one or more memory devices 24, 30 may store a variety of information and may be used for various purposes. For example, the one or more memory devices 24, 30 may store machine-readable and/or processor-executable instructions (e.g., firmware or software) for the one or more processors 22, 28, respectively, to execute, such as instructions for uploading and downloading driving condition information. The one or more memory devices 24, 30 may include one or more storage devices (e.g., nonvolatile storage devices) that may include read-only memory (ROM), flash memory, a hard drive, or any other suitable optical, magnetic, or solid-state storage medium, or a combination thereof.

While the controller 20 is illustrated as a component of the autonomous vehicle 14, in some embodiments, at least a portion of the controller 20 may be separate from and external to the autonomous vehicle 14. For example, the controller 20 may be part of the autonomous vehicle 14, the mobile device 16, and/or any other suitable electronic device. In one embodiment, the controller 20 may include multiple controllers, such as a first controller in the autonomous vehicle 14 and a second controller in the mobile device 16. Additionally or alternatively, at least a portion of the controller 26 may be separate from and external to the mobile device 16. For example, the controller 26 may be part of the autonomous vehicle 14, the mobile device 16, and/or any other suitable electronic device. In one embodiment, the controller 26 may include multiple controllers, such as a first controller in the autonomous vehicle 14 and a second controller in the mobile device 16. In certain embodiments, the controller 20 may be omitted from the autonomous vehicle 14 or the controller 26 may be omitted from the mobile device 16.

The autonomous vehicles 14 may include one or more vehicle sensors 40 that detect vehicle sensor information indicative of driving conditions (e.g., first driving conditions). Examples of the one or more vehicle sensors 40 may include accelerometers, gyroscopes, magnetometers, location sensors (e.g., that use global positioning system ("GPS") technology), ultrasonic sensors, electrostatic sensors, inductive sensors, cameras, radio detection and ranging ("RADAR") sensors that emit radio waves to detect the driving conditions, light detection and ranging ("LIDAR") sensors, sound navigation ranging ("SONAR") sensors, or any other sensor that may detect driving condition information. Such driving condition information detectable by the one or more vehicle sensors 40 may include a location (e.g., a geographic location/area of the autonomous vehicle 14), weather conditions (e.g., precipitation type, precipitation amount/rate, temperature, humidity, barometric pressure), road conditions (e.g., potholes, road grade, surface traction, surface conditions), road markings (e.g., dashed/solid lane lines, stop lines, lane markings/verbiage), objects disposed proximate to and/or along a pathway of the autonomous vehicle (e.g., animals, rocks, trees, fire hydrants, stop lights, guard rails), other vehicles (e.g., other vehicles moving along the roadway, other vehicles stationary on the roadway and/or to a side of the roadway, other autonomous vehicles, non-autonomous vehicles, emergency vehicles, public transportation vehicles, school vehicles), structures (e.g., buildings), signs (e.g., stop signs, yield signs), municipalities, natural disasters, and other driving conditions that may be useful for operation of the autonomous vehicle and other vehicles (e.g., other autonomous vehicles, other non-autonomous vehicles).

The mobile devices 16 may include one or more device sensors 42 (e.g., mobile device sensors) that detect mobile device sensor information indicative of driving conditions (e.g., second driving conditions). Examples of the one or more device sensors 42 may include accelerometers, gyroscopes, magnetometers, location sensors (e.g., that use global positioning system ("GPS") technology), or any other sensor that may detect driving condition information. Such driving condition information detectable by the one or more device sensors 42 may include a location (e.g., a location of the autonomous vehicle 14 and/or the mobile device 16), weather conditions (e.g., temperature, humidity, barometric pressure), road conditions (e.g., potholes, road grade, surface traction, surface conditions), and other driving conditions that may be useful for operation of the autonomous vehicle and other vehicles (e.g., other autonomous vehicles, other non-autonomous vehicles). The mobile device 16 may be any mobile electronic device suitable for detecting and communicating the driving condition information, such as a smart phone, a smart watch, a navigation device (e.g., a GPS vehicle navigation tool), and so forth.

The autonomous vehicles 14 and the mobile devices 16 may include respective communication interfaces 50, 52 that enable the autonomous vehicles 14 and the mobile devices 16 to communicatively couple to other devices and the driving condition database 18 via the communication network 12. The communication network 12 may support and facilitate communication between the autonomous vehicles 14, the mobile device 16, and the driving condition database 18. For example, the communication network 12 may enable communication between the autonomous vehicles 14, the mobile device 16, and the driving condition database 18 via any suitable communication protocol, such as a wireless communication protocol (e.g., associated with mobile communication, WiFi, LAN, WAN, the Internet, telephone service, and the like) and/or a wired communication protocol. Moreover, while the communication network 12 is referred to as a single communication network, it should be understood that the communication network 12 may include multiple communication networks that may send and receive information between each other.

The communication interface 50 of the autonomous vehicle 14 may enable the controller 20 of the autonomous vehicle 14 and/or a vehicle bus of the autonomous vehicle 14 (e.g., controller area network ("CAN") bus) to communicate with the driving condition database 18 via the communication network 12. The vehicle bus and/or the controller 20 may receive a variety of sensor data from the various vehicle sensors 40 for subsequent transmission to the driving condition database 18. Additionally, the communication interface 52 may enable the controller 26 of the mobile device 16 to communicate with the driving condition database 18 via the communication network 12. The controller 26 may receive a variety of sensor data from the various device sensors 42 for subsequent transmission to the driving condition database 18. In certain embodiments, the communication interface 52 may enable the controller 26 of the mobile device 16 to communicate with the vehicle bus and/or the controller 20 of the autonomous vehicle 14 via the communication network 12. For example, the vehicle bus and/or the controller 20 may receive both the vehicle sensor information from the vehicle sensors 40 and the mobile device sensor information from the mobile devices 16 for subsequent upload to the driving condition database 18 via the communication network 12.

The driving condition database 18 may store the driving condition information received from the autonomous vehicles 14 and/or the mobile devices 16. For example, after the vehicle sensor information indicative of the driving conditions is detected by the vehicles sensors 40, the vehicle sensor information may be sent/uploaded to the driving condition database 18 via the communication interface 50 and the communication network 12. Additionally, after the mobile device sensor information indicative of the driving conditions is detected by the device sensors 42, the mobile device sensor information may be sent/uploaded to the driving condition database 18 via the communication interface 52 and the communication network 12. As described above, the mobile device sensor information may also be sent to the autonomous vehicle 14 from the mobile device 16 for subsequent upload to the driving condition database 18. Further, the driving condition information may be communicated/downloaded from the driving condition database 18 to the autonomous vehicles 14. For example, the autonomous vehicles 14 may download the driving condition information from the driving condition database 18 via the communication interface 50 and the communication network 12 to assist in operating the autonomous vehicles 14.

As illustrated, the autonomous vehicle 14 includes connection rating determination logic 60 that facilitates determining a connection rating of a connection between the communication interface 50 of the autonomous vehicle 14 and the communication network 12. In particular, the connection rating determination logic 60 may determine whether the connection rating is a high rating that would enable the autonomous vehicle 14 to upload the vehicle sensor information and/or the mobile device sensor information to the driving condition database 18 or a low rating that would limit and/or prevent the autonomous vehicle 14 from uploading the vehicle sensor information and/or the mobile device sensor information to the driving condition database 18.

The connection rating determination logic 60 may determine whether the connection rating is the high rating or the low rating based on a signal strength and/or a signal-to-noise ratio ("SNR") of the connection between the communication interface 50 of the autonomous vehicle 14 and the communication network 12. For example, based on the signal strength of the connection being greater than or equal to a threshold signal strength, the connection rating determination logic 60 may determine that the connection rating is the high rating. Based on the signal strength of the connection being less than the threshold signal strength, the connection rating determination logic may determine that the connection is the low rating. In some embodiments, based on the signal strength of the connection being less than or equal to the threshold signal strength, the connection rating determination logic may determine that the connection is the low rating.

Additionally or alternatively, the connection rating determination logic 60 may determine whether the connection rating is the high rating or the low rating by comparing the SNR of the connection to a threshold SNR. For example, based on the SNR of the connection being greater than or equal to a threshold SNR, the connection rating determination logic 60 may determine that the connection rating is the high rating. Based on the SNR of the connection being less than the threshold SNR, the connection rating determination logic may determine that the connection is the low rating. In some embodiments, based on the SNR of the connection being less than or equal to the threshold SNR, the connection rating determination logic may determine that the connection is the low rating.

The connection rating determination logic 60 may determine the threshold signal strength and/or the threshold SNR based on a current geographic area of the autonomous vehicle 14, one or more expected geographic areas of the autonomous vehicle 14, type(s) of the driving condition information ready for transmission to the driving condition database 18 via the communication interface 50, a type of the autonomous vehicle 14, type(s) of the vehicles sensors 40, type(s) of the device sensors 42, a quantity of the vehicles sensors 40 and/or the device sensors 42, a quantity of the vehicle sensor information and/or the mobile device sensor information, and other factors that may affect a current signal strength and a current noise level of the connection and/or a future/expected signal strength and a future/expected noise level of the connection. For example, if the signal strength of the connection is relatively low (e.g., relative to a typical/average signal strength of the connection) at the current geographic area of the autonomous vehicle 14, and the signal strength is not expected to improve or increase at an expected geographic area of the autonomous vehicle 14, the connection rating determination logic 60 may set the threshold signal strength relatively low. Doing so may enable the autonomous vehicle 14 to at least attempt uploading the driving condition information to the driving condition database 18 at the current geographic area when the signal strength of the connection is expected to be higher than a future signal strength at the expected geographic area (e.g., when the autonomous vehicle 14 may be less capable of uploading the driving condition information to the driving condition database 18). In some embodiments, if the signal strength of the connection is relatively high at the current geographic area, and the signal strength is not expected to diminish or decrease at the expected geographic area, the connection rating determination logic may set the threshold signal strength relatively high. Doing so may enable the autonomous vehicle 14 to limit an amount of the driving condition information uploaded by the autonomous vehicle 14 to the driving condition database 18 and/or a rate at which the driving condition information is uploaded by the autonomous vehicle 14 to the driving condition database 18, which may conserve energy, power, and other resources of the autonomous vehicle 14.

In certain embodiments, the connection rating determination logic may determine the threshold signal strength as a percentage of a maximum signal strength (e.g., ten percent, twenty percent, thirty percent, forty percent, fifty percent, sixty percent, seventy percent, eighty percent, ninety percent). In other embodiments, the connection rating determination logic may determine the threshold signal strength as a numerical value (e.g., 0 decibel-milliwatts ("dBm"), −10 dBm, −20 dBm, −30 dBm, −40 dBm, −50 dBm, −60 dBm, −75 dBm, −95 dBm, −99 dBm).

In certain embodiments, the connection rating determination logic may determine the threshold SNR as a percentage of a maximum SNR (e.g., ten percent, twenty percent, thirty percent, forty percent, fifty percent, sixty percent, seventy percent, eighty percent, ninety percent). In other embodiments, the connection rating determination logic may determine the threshold SNR as a numerical value (e.g., 10 dBm, 15 dBm, 20 dBm, 25 dBm, 30 dBm, 35 dBm, 40 dBm, 50 dBm, 60 dBm, 75 dBm, 95 dBm).

In some embodiments, the connection rating determination logic 60 may categorize the connection rating into additional/other connection rating categories. For example, the connection rating determination logic 60 may determine whether the connection rating of the connection is a low, medium, or high rating, and the controller 20 may control the upload of the driving condition information by the communication interface 50 (e.g., to allow the communication interface 50 to upload the driving condition information, to pause the upload of the driving condition information, to stop the upload of the driving condition information, to limit an amount of the driving condition information uploaded, to limit a rate at which the driving condition information is uploaded) based on the categorization. In other embodiments, the connection rating determination logic 60 may categorize the connection rating into any suitable number of connection rating categories (e.g., four connection rating categories, ten connection rating categories, twenty connection rating categories), and may control the upload of the driving condition information by the communication interface 50 based on the categorization.

The mobile device 16 also includes data gathering and processing logic 62 that facilitates gathering and/or processing the vehicle sensor information detected by and received from the vehicle sensors 40 and/or the mobile device sensor information detected by and received from the device sensors 42 (e.g., the driving condition information). In particular, the data gathering and processing logic 62 may gather and/or process the driving condition information received from the vehicle sensors 40 and/or the device sensors 42 when the connection rating of the connection between the communication interface 50 and the communication network 12 is the high rating, when the connection rating of the connection between the communication interface 50 and the communication network 12 is the low rating, when the upload of the driving condition information to the driving condition database 18 is paused, stopped, or otherwise restricted, or in other situations suitable for gathering and processing the driving condition information for subsequent upload to the driving condition database 18. In some embodiments, the data gathering and processing logic 62 may be omitted and/or may not be used, such that the vehicle sensor information detected by the vehicle sensors 40 and/or the mobile device sensor information detected by the device sensors 42 (e.g., the driving condition information) is uploaded directly to the driving condition database 18 (e.g., in an unprocessed format).

In certain embodiments, the data gathering and processing logic 62 may only gather and/or process the vehicle sensor information and/or the mobile device sensor information when the connection rating is the low rating (e.g., when the communication interface 50 is not uploading the driving condition information to the driving condition database 18 and/or when the upload of the driving condition information to the driving condition database 18 is otherwise restricted). Doing so may allow the data gathering and processing logic 62 to process the driving condition information (e.g., pre-process the driving condition information) for subsequent upload to the driving condition database 18, rather than simply storing the driving condition information at the autonomous vehicle 14. For example, the data gathering and processing logic 62 may process the vehicle sensor information and the mobile device sensor information to generate assessed driving conditions. The data gathering and processing logic 62 processing the driving condition information may save time, processing power, and memory at the driving condition database 18 and/or at other controllers/systems communicatively coupled to the communication network 12.

While the connection rating determination logic 60 and the data gathering and processing logic 62 are illustrated as being separate or external to the controller 20 of the autonomous vehicle 14, it should be understood that, in some embodiments, the controller 20 may include the connection rating determination logic 60 and/or the data gathering and processing logic 62. Additionally, while the connection rating determination logic 60 and the data gathering and processing logic 62 are illustrated as being included in the autonomous vehicle 14, a portion or all of the connection rating determination logic 60 and the data gathering and processing logic 62 may be included in the mobile device 16 (e.g., the controller 26 may include the connection rating determination logic 60 and/or the data gathering and processing logic 62, or the connection rating determination logic 60 and/or the data gathering and processing logic 62 may be included elsewhere in the mobile device 16). In some embodiments, the mobile device 16 may include a separate/different connection rating determination logic that determines a connection rating between the communication interface 52 and the communication network 12 and/or a separate/different data gathering and processing logic that gathers and processes the mobile device sensor information received from the device sensors 42. Further, the term "logic" as used herein may include software (e.g., instructions executable by a processor, such as the processor 22 and/or the processor 28), hardware (e.g., circuitry), or a combination of the two.

In certain embodiments, the autonomous vehicle 14 may include a data download determination logic, which may determine whether/when to download the driving condition information from the driving condition database 18, a rate at which to download the driving condition information from the driving condition database 18, and/or an amount of the driving condition information to download from the driving condition database 18. The data download determination logic may make such determinations based on the connecting rating of the connection between the communication network 12 and the communication interface 50 of the autonomous vehicle 14, the expected connection rating of the connection between the communication network 12 and the communication interface 50 of the autonomous vehicle 14, one or more types of the driving condition information to be downloaded from the driving condition database 18, and other factors.

For example, if the connection rating is the high rating, the data download determination logic may determine that the autonomous vehicle 14 should proceed to download the driving condition information. If the connection rating is the low rating, the data download determination logic may determine that the autonomous vehicle 14 should continue operating without downloading driving condition information and subsequently download the driving condition information once the connection rating is the high rating. Additionally, the data download determination logic may determine that the autonomous vehicle 14 should download and store additional driving condition information (e.g., more driving condition information than would typically be downloaded) when the connection rating is the high rating and the expected connection rating is the low rating. Doing so allows the autonomous vehicle 14 to download and store the driving condition information for areas in which the connection rating is the low rating and where the autonomous vehicle 14 would otherwise not be able to download the driving condition information.

Figure 2:
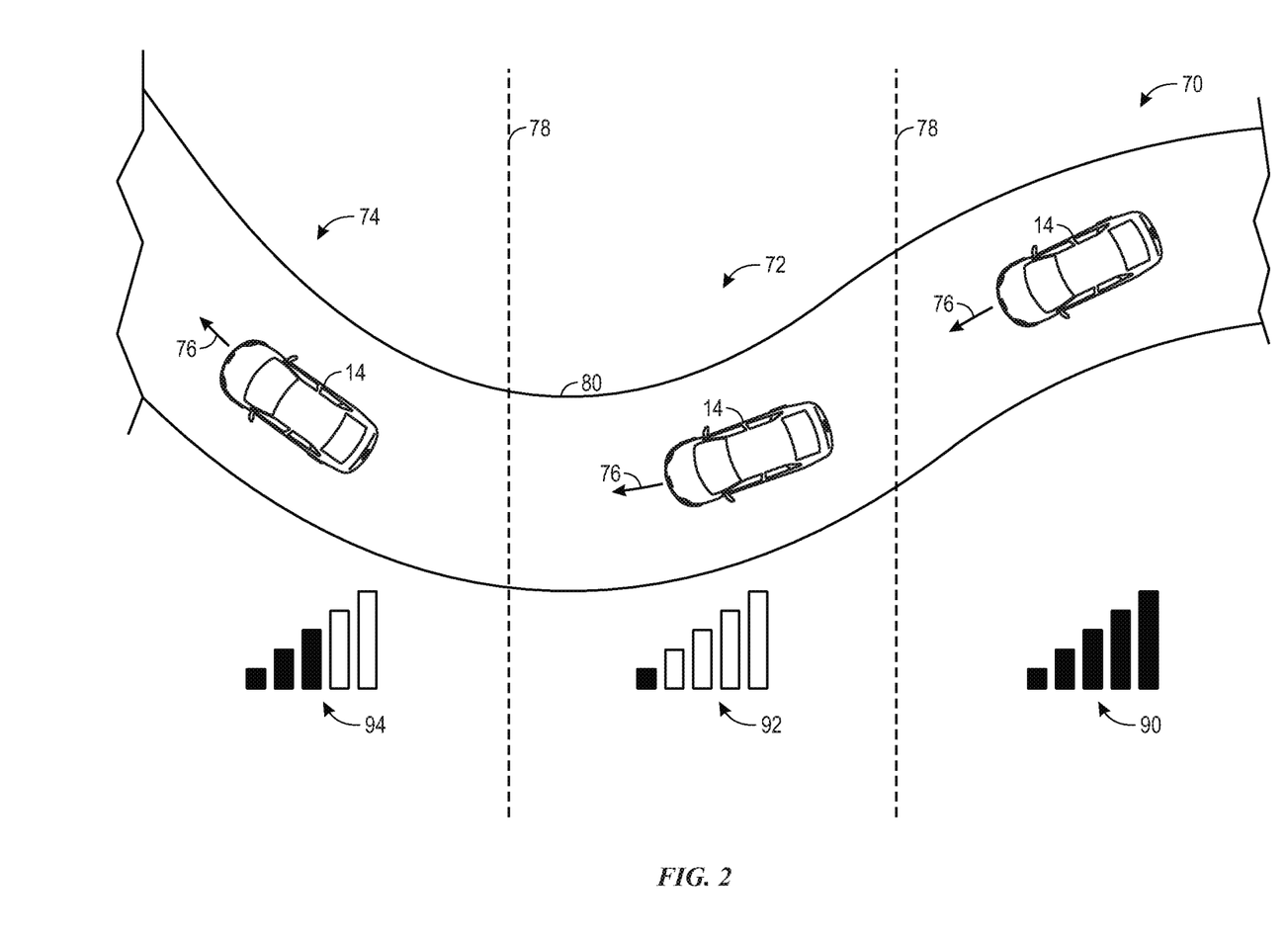
FIG. 2 is a top view of an autonomous vehicle disposed within different geographic areas that may use the autonomous vehicle network system of FIG. 1, according to embodiments of the present disclosure.

FIG. 2 is a top view of the autonomous vehicle 14 disposed at different geographic areas, according to embodiments of the present disclosure. For example, the autonomous vehicle 14 may be positioned at a first geographic area 70 at a first time, at a second geographic area 72 at a second time after the first time, and at a third geographic area 74 at a third time after the second time (e.g., the autonomous vehicle 14 may proceed from the first geographic area 70 to the second geographic area 72 to the third geographic area 74, as indicated by arrows 76). As illustrated, the geographic areas 70, 72, and 74 are separated by dashed lines 78. Additionally, the autonomous vehicle 14 is illustrated as moving along a pathway 80, which may be a roadway (e.g., a highway, a freeway, a dirt road, a gravel road), a driveway, a path in a parking garage, a path in a parking lot, a drive-thru of a business, or another suitable pathway on which the autonomous vehicle 14 may travel and/or operate. As the autonomous vehicle 14 moves along the pathway 80 (e.g., through the first geographic area 70, the second geographic area 72, and the third geographic area 74), the connection rating (e.g., the signal strength and/or the SNR) of the connection between the communication network 12 and the communication interface 50 of the autonomous vehicle 14 may vary due to weather, changing terrain/landscape, other autonomous vehicles 14, changing distances between the autonomous vehicle 14 and a communication tower of the communication network 12, and other factors that may affect the connection rating.

As the autonomous vehicle 14 moves along the pathway 80, the connection rating determination logic 60 may determine the connection rating, and the controller 20 of the autonomous vehicle 14 may control the upload and/or download of the driving condition information to and/or from the driving condition database 18 based on the connection rating. For example, at the first geographic area 70, the connection rating determination logic 60 may determine that the connection has a first connection rating 90. As illustrated, the first connection rating 90 is five full bars, which may indicate a high rating of the connection between the communication network 12 and the communication interface 50 of the autonomous vehicle 14. Based on (e.g., in response to) the first connection rating 90 being the high rating, the controller 20 of the autonomous vehicle 14 may instruct the communication interface 50 to send (e.g., upload) the vehicle sensor information and the mobile device sensor information (e.g., the driving condition information) to the driving condition database 18. The vehicle sensor information and the mobile device sensor information may include data detected at the first geographic area 70 and/or data previously detected and stored in the autonomous vehicle 14 (e.g., prior to the autonomous vehicle entering the first geographic area 70). In certain embodiments, based on the first connection rating 90 being the high rating, the controller 20 of the autonomous vehicle 14 may instruct the communication interface 50 to download the driving condition information related to driving conditions in the first geographic area 70. In some embodiments, in response to the connection rating being the high rating, the vehicle sensor information and the mobile device sensor information may be stored in short-term memory (e.g., in volatile memory like RAM and/or in a cache) of the one or more memory devices 24 and not in long-term memory (e.g., in nonvolatile memory like ROM) of the one or more memory devices 24.

At the second geographic area 72, the connection rating determination logic 60 may determine that the connection has a second connection rating 92. As illustrated, the second connection rating 92 is one full bar, which may indicate a low rating of the connection between the communication network 12 and the communication interface 50 of the autonomous vehicle 14. Based on the second connection rating 92 being the low rating, the controller 20 of the autonomous vehicle 14 may instruct the data gathering and processing logic 62 to gather and/or process the vehicle sensor information and the mobile device sensor information. Additionally, based on the second connection rating 92 being the low rating, the controller 20 may store the gathered and/or processed vehicle sensor information and mobile device sensor information in a storage device, such as the one or more memory devices 24 of the controller 20, for subsequent upload to the driving condition database 18 (e.g., when the connection rating is the higher rating suitable for uploading the driving condition information). The vehicle sensor information and the mobile device sensor information may include data detected at the second geographic area 72 and/or data previously detected and stored in the autonomous vehicle 14 (e.g., prior to the autonomous vehicle entering the second geographic area 72, such as at the first geographic area 70). In certain embodiments, the vehicle sensor information and the mobile device sensor information may be stored in RAM and/or ROM of the one or more memory devices 24. In some embodiments, the vehicle sensor information and the mobile device sensor information may not be stored in RAM and/or ROM of the one or more memory devices 24.

In certain embodiments, based on the second connection rating 92 being the low rating, the controller 20 of the autonomous vehicle 14 may not instruct the communication interface 50 to download the driving condition information related to driving conditions in the second geographic area 72 (e.g., the autonomous vehicle 14 may not be capable of downloading the driving condition information from the driving condition database 18 due to the second connection rating 92 being the low rating). In some embodiments, while the autonomous vehicle 14 is in the first geographic area 70 or in another geographic area prior to entering the first geographic area 70, the controller 20 may determine that the second connection rating 92 (e.g., an expected connection rating) will be the low rating, and may download additional driving condition information related to driving conditions of the second geographic area 72. Doing so may enable the autonomous vehicle 14 to download and save the driving condition information related to the driving conditions of the second geographic area 72 for use in controlling/operating the autonomous vehicle 14, or portions thereof, while the autonomous vehicle 14 is in the second geographic area 72. The controller 20 may determine that the expected connection rating (e.g., the second connection rating 92) will be the low rating or the high rating based on data received from the driving condition database 18, detected data at the first geographic area 70 (e.g., vehicle sensor information and/or mobile device sensor information) that is expected to last/remain in the second geographic region (e.g., a storm or other weather conditions), traffic, a road type, road conditions, or driving condition information received directly from other vehicles in or that have passed through the second geographic area 72.

At the third geographic area 74, the connection rating determination logic 60 may determine that the connection has a third connection rating 94. As illustrated, the third connection rating 94 is three full bars, which may indicate a high rating of the connection between the communication network 12 and the communication interface 50 of the autonomous vehicle 14. In certain embodiments, the third connection rating 94 being three full bars may indicate a low rating or a medium rating of the connection. Based on the third connection rating 94 being the high rating, the controller 20 of the autonomous vehicle 14 may instruct the communication interface 50 to send (e.g., upload) the vehicle sensor information and the mobile device sensor information (e.g., the driving condition information) to the driving condition database 18. The vehicle sensor information and the mobile device sensor information may include data detected at the third geographic area 74 and/or data previously detected and stored in the autonomous vehicle 14 (e.g., prior to the autonomous vehicle entering the third geographic area 74). In certain embodiments, based on the third connection rating 94 being the high rating, the controller 20 of the autonomous vehicle 14 may instruct the communication interface 50 to download the driving condition information related to driving conditions in the third geographic area 74 and/or driving conditions in a geographic area that the autonomous vehicle will pass through after the third geographic area 74.

In certain embodiments, the connection rating determination logic 60 may compare the determined connection rating (e.g., the number of full bars in the illustrated embodiment) to a threshold connection rating (e.g., a threshold, a threshold signal strength, and/or the threshold SNR). For example, threshold connection rating may be two and a half bars. If the connection rating is three full bars or more (e.g., the first connection rating 90 and the third connection rating 94), the connection rating determination logic 60 may determine that the connection rating is the high rating. If the connection rating is two full bars or less (e.g., the second connection rating 92), the connection rating determination logic 60 may determine that the connection rating is the low rating. In other embodiments, the threshold connection rating may be another amount of full bars, such as one half bar, one bar, one and a half bars, two bars, three bars, three and a half bars, four bars, or four and half bars.

In some embodiments, as described above, the connection rating determined by the connection rating determination logic 60 may be represented in other manners. For example, the connection rating may be a percentage (e.g., seventy percent) of a maximum signal strength, and the threshold connection rating may be threshold percentage (e.g., sixty percent) of the maximum signal strength. In other embodiments, the connection rating may be a numerical value (e.g., −20 dBm) indicative of a signal strength, and the threshold connection rating may be a threshold numerical value (e.g., −30 dBm) corresponding to the numerical value indicative of the signal strength.

In certain embodiments, as described above, the connection rating determined by the connection rating determination logic 60 may be represented in other manners. For example, the connection rating may be a percentage (e.g., seventy percent) of a maximum SNR, and the threshold connection rating may be threshold percentage (e.g., sixty percent) of the maximum SNR. In other embodiments, the connection rating may be a numerical value (e.g., 40 dBm) indicative of the SNR, and the threshold connection rating may be a threshold numerical value (e.g., 25 dBm) corresponding to the numerical value indicative of the SNR.

Figure 3:
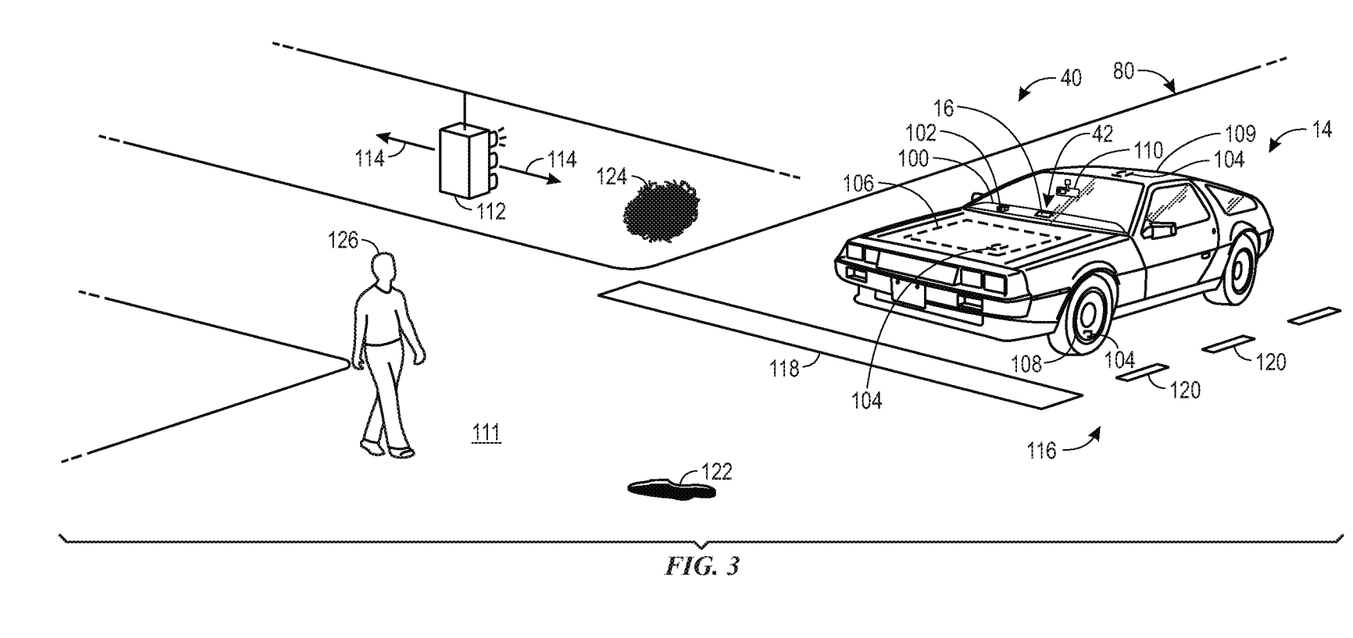
FIG. 3 is a perspective view of an autonomous vehicle that may use the autonomous vehicle network system of FIG. 1, according to embodiments of the present disclosure.

FIG. 3 is a diagram of the autonomous vehicle 14 including the vehicle sensors 40, according to embodiments of the present disclosure. Additionally, the mobile device 16 including the device sensors 42 is disposed within the autonomous vehicle 14 (e.g., on a dashboard 100 of the autonomous vehicle 14). As described above, the vehicle sensors 40 may detect vehicle sensor information indicative of driving conditions, and the device sensors 42 may detect mobile device sensor information indicative of driving conditions. The vehicle sensor information and/or the mobile device sensor information may be gathered and/or processed by the data gathering and processing logic 62 and/or uploaded to the driving condition database 18 (e.g., with or without having been processed by the data gathering and processing logic 62).

The vehicle sensors 40 include a camera 102 disposed on the dashboard 100 and sensors 104 disposed on an engine 106, a wheel 108, and a roof 109 of the autonomous vehicle 14. In some embodiments, the camera 102 may be installed by a vehicle manufacturer and/or mounted to another suitable component of the autonomous vehicle 14, such as a rear-view mirror 110. In alternative or additional embodiments, the camera 102 may be an aftermarket product that is purchased and/or installed by a driver of the autonomous vehicle 14 or a vehicle electronics installer. As illustrated, the autonomous vehicle 14 includes three sensors 104, though any suitable number of sensors 104 (e.g., more or fewer) are contemplated.

The camera 102 may include any suitable device that captures images and/or videos. Moreover, while the camera 102 is shown as being mounted in an interior of the autonomous vehicle 14 (e.g., to the dashboard 100), the camera 102 may be attached to any suitable portion of the autonomous vehicle 14 or other location to capture images and/or videos of the surrounding area of the autonomous vehicle 14, such as on the exterior of the autonomous vehicle 14 or separate from the autonomous vehicle 14. For example, the camera 102, in some cases, may be handheld, mounted to an article of clothing (e.g., a helmet) of an occupant of the autonomous vehicle 14, or so on. The camera 102 may capture videos at any suitable frame rate, including any frame rate between 20 and 100 frames per second (fps), such as 23.976 fps, 23.98 fps, 24 fps, 25 fps, 29.97 fps, 30 fps, 50 fps, 59.94 fps, or 60 fps.

As illustrated, the camera 102 is forward-facing, such that the camera 102 may capture images/video in front of the autonomous vehicle 14. In certain embodiments, the autonomous vehicle 14 may include cameras 102 that capture images/video in other directions/positions relative to the autonomous vehicle 14, such as behind the autonomous vehicle 14, to a side of the autonomous vehicle 14, near a corner of the autonomous vehicle 14, above the autonomous vehicle 14, and/or below the autonomous vehicle 14 (e.g., two cameras 102, three cameras 102, six cameras 102, twelve cameras 102, fifty cameras 102).

The camera 102 may detect certain driving conditions and/or the controller 20, or another suitable controller, may determine certain driving conditions based on the images and/or video captured by the camera 102. For example, in the illustrated embodiment, the autonomous vehicle 14 is positioned adjacent to an intersection 111, and a stoplight 112 is positioned generally above the intersection 111 and in front of the autonomous vehicle 14. The camera 102 may record images and/or video of the stoplight 112. Based on movement of stoplight 112 (e.g., different positions in different/sequenced images and/or within a given video, as indicated by arrows 114), the controller 20 may determine that the wind is blowing outside the autonomous vehicle 14 (e.g., at the geographic area including the intersection 111) and may determine the wind speed based on a distance that the stoplight 112 has moved over a given time period and a weight of the stoplight 112.

Additionally, the camera 102 may detect the presence and/or a state (e.g., condition, age, brightness) of road markings 116 along the pathway 80, such as the stop line 118 and the lane markings 120. In certain embodiments, the camera 102 may detect a presence, a shape, and/or a depth of a pothole 122 within the pathway 80. In some embodiments, the camera 102 may detect the presence, shape, and/or movement of certain obstacles along and/or on the pathway 80, such as a bush 124, a person 126, and/or other obstacles (e.g., animals, rocks, trees, fire hydrants, stop lights, guard rails). Further, the camera 102 may detect a location (e.g., a geographic location/area of the autonomous vehicle 14 based on recognized landmarks), weather conditions (e.g., based on recognized precipitation types and/or heat waves), other roadway conditions (e.g., road grade, surface traction, surface conditions), other vehicles (e.g., other vehicles moving along the pathway 80, other vehicles stationary on the pathway 80 and/or to a side of the pathway 80, other autonomous vehicles 14, non-autonomous vehicles, emergency vehicles, public transportation vehicles, school vehicles), structures (e.g., buildings), signs (e.g., stop signs, yield signs), other objects proximate to the autonomous vehicles 14, and other driving conditions that may be useful for operation of the autonomous vehicle and other vehicles (e.g., other autonomous vehicles, other non-autonomous vehicles). The images and/or video captured by the camera 102 may be gathered and/or processed by the data gathering and processing logic 62 for subsequent upload to the driving condition database 18.

In certain embodiments, the controller 20 may determine other driving conditions of the geographic area in which the autonomous vehicle 14 is operating. For example, based on vertical and/or horizontal movement of objects in the environment (e.g., the pathway 80, the stoplight 112, the bush 124, the person 126, and/or other obstacles), the controller 20 may determine that the ground is shaking and/or that an earthquake is occurring. In some embodiments, the controller 20 may determine that there is flooding in the geographic area and/or a severity of the flooding (e.g., low, moderate, high, severe) based on rising water levels in the geographic area and/or a rate at which the water level is rising. In certain embodiments, the controller 20 may determine that the pathway 80 is partially or completely blocked due to the presence of obstacles on the pathway 80. For example, based on detection by the vehicle sensors 40 and/or the device sensors 42 that a tree has fallen onto the pathway 80, such that the pathway 80 is impassable by the autonomous vehicle 14 and/or other vehicles.

Each sensor 104 may detect vehicle sensor information (e.g., data indicative of driving conditions on, along, and/or adjacent to the pathway 80). For example, the sensors 104 may include accelerometers, gyroscopes, magnetometers, location sensors (e.g., that use global positioning system ("GPS") technology), ultrasonic sensors, electrostatic sensors, inductive sensors, radio detection and ranging ("RADAR") sensors, light detecting and ranging ("LIDAR") sensors, sound navigation ranging ("SONAR") sensors, or any other sensor that may detect driving condition information. Such driving condition information detectable by the one or more vehicle sensors 40 may include a location (e.g., a geographic location/area of the autonomous vehicle 14), weather conditions (e.g., precipitation type, precipitation amount/rate, temperature, humidity, barometric pressure), road conditions (e.g., potholes, road grade, surface traction, surface conditions), road markings (e.g., dashed/solid lane lines, stop lines, lane markings/verbiage), objects disposed proximate to and/or along a pathway of the autonomous vehicle (e.g., animals, rocks, trees, fire hydrants, stop lights, guard rails), other vehicles (e.g., other vehicles moving along the roadway, other vehicles stationary on the roadway and/or to a side of the roadway, other autonomous vehicles, non-autonomous vehicles, emergency vehicles, public transportation vehicles, school vehicles), structures (e.g., buildings), signs (e.g., stop signs, yield signs), municipalities, natural disasters, and other driving conditions that may be useful for operation of the autonomous vehicle and other vehicles (e.g., other autonomous vehicles, other non-autonomous vehicles). The vehicle sensor information detected by the sensors 104 may be gathered and/or processed by the data gathering and processing logic 62 for subsequent upload to the driving condition database 18.

The mobile device 16 may include the device sensors 42 that detect a location (e.g., a location of the autonomous vehicle 14 and/or the mobile device 16), weather conditions (e.g., temperature, humidity, barometric pressure), road conditions (e.g., potholes, road grade, surface traction, surface conditions), and other driving conditions that may be useful for operation of the autonomous vehicle and other vehicles (e.g., other autonomous vehicles, other non-autonomous vehicles). As described above, examples of the one or more device sensors 42 may include accelerometers, gyroscopes, magnetometers, location sensors (e.g., that use global positioning system ("GPS") technology), or any other sensor that may detect driving condition information. Additionally, in some cases, the mobile device 16 may include a camera that detects the mobile device sensor information indicative of driving conditions, such as the driving conditions detectable by the camera 102.

Figure 4:
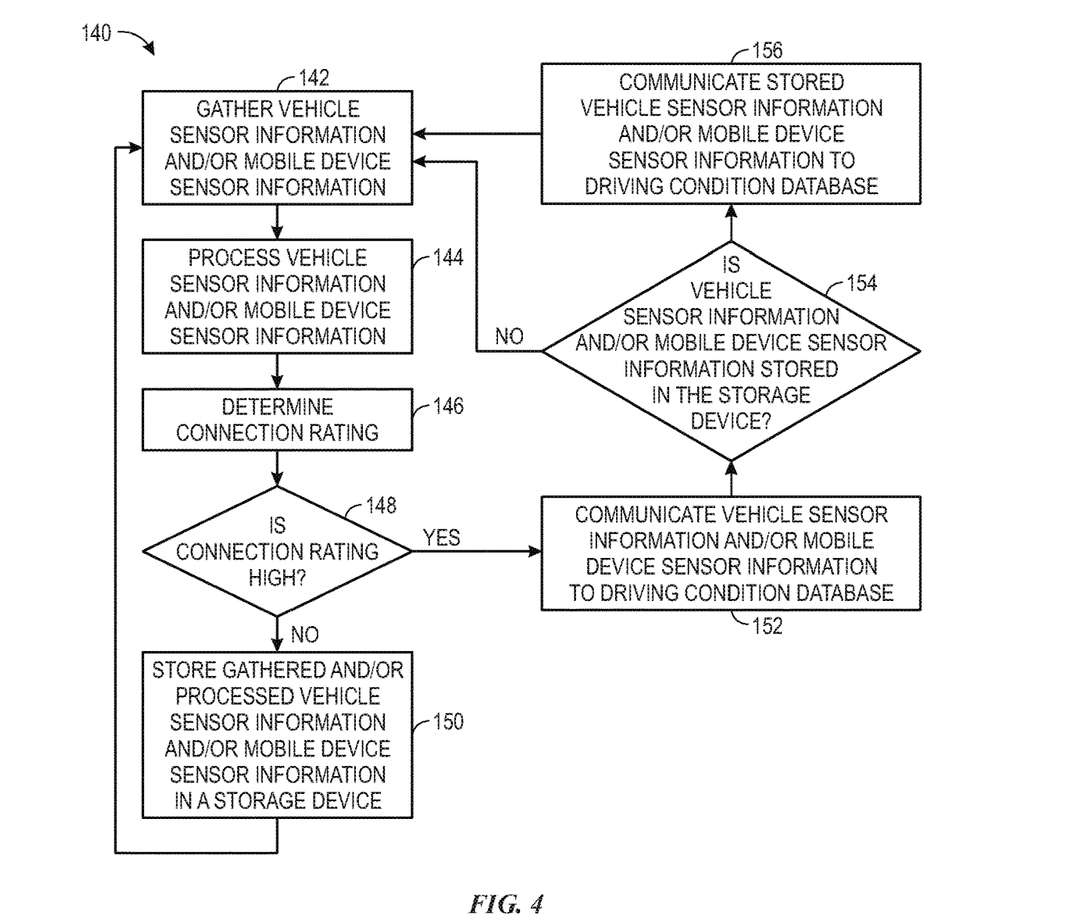
FIG. 4 is a flowchart illustrating a method for communicating vehicle sensor information and/or mobile device sensor information indicative of driving conditions, which may be performed by the autonomous vehicle of FIG. 3 via the autonomous vehicle network system of FIG. 1, according to embodiments of the present disclosure.

With this in mind, FIG. 4 is a flowchart illustrating a method 140 for gathering, processing, storing, and/or communicating vehicle sensor information and/or mobile device sensor information based on a connection rating, according to embodiments of the present disclosure. The method 140 may be performed by any suitable device that may control components of the autonomous vehicle network system 10 of FIG. 1, such as the controller 20 of the autonomous vehicle 14, the controller 26 of the mobile device 16, the connection rating determination logic 60, and/or the data gathering and processing logic 62. While the method 140 is described using steps in a specific sequence, it should be understood that the present disclosure contemplates that the described steps may be performed in different sequences than the sequence illustrated, and certain described steps may be skipped or not performed altogether. In some embodiments, the method 140 may be implemented by executing instructions stored in a tangible, non-transitory, computer-readable medium, such as the one or more memory devices 24 and/or 30, using a processor, such as the one or more processors 22 and/or 28.

As illustrated, in process block 142, the data gathering and processing logic 62 of the autonomous vehicle 14 gathers data indicative of driving conditions. In particular, the data gathering and processing logic 62 may receive vehicle sensor information indicative of the driving conditions from the vehicles sensors 40 of the autonomous vehicle 14 and/or mobile device sensor information indicative of the driving conditions from the device sensors 42 of the mobile device 16. The data gathering and processing logic 62 may receive the mobile device sensor information from the device sensors 42 via the communication network 12, the communication interface 50 of the autonomous vehicle 14, and the communication interface 52 of the mobile device 16.

In process block 144, the data gathering and processing logic 62 may process the vehicle sensor information and/or the mobile device sensor information (e.g., the data gathered in process block 142). For example, the data gathering and processing logic 62 may reformat, compress, analyze, and/or other process the vehicle sensor information and/or the mobile device sensor information, such that the vehicle sensor information and/or the mobile device sensor information is representative of the driving condition information (e.g., to generate/determine assessed driving conditions). In certain embodiments, the process block 144 may be omitted from the method 140.

By way of specific example, the vehicle sensor information and/or the mobile device sensor information may include a series of barometric pressure measurements (e.g., two measurements, five measurements, twenty measurements, one hundred measurements, one thousand measurements) taken over a period of time (e.g., one minute, five minutes, thirty minutes) at a particular geographic location. The data gathering and processing logic 62 may process/analyze the measurements and determine that the barometric pressure has dropped suddenly/significantly over the period time, which may indicate an approaching storm and/or other changing weather conditions at the particular geographic location. Such weather conditions may be driving condition information suitable for upload to the driving condition database 18. As described above, processing of the vehicle sensor information and/or the mobile device sensor information by the data gathering and processing logic 62 (e.g., at the autonomous vehicle 14) may save time and/or processing power at other portions of the autonomous vehicle network system 10, such as at the driving condition database 18.

By way of another example, the vehicle sensor information and/or the mobile device sensor information may include accelerometer data indicative of increased acceleration at a particular geographic location. The data gathering and processing logic 62 may process/analyze the accelerometer data and determine that the accelerometer data is indicative of a series of potholes or other poor driving conditions at the particular geographic location. Such poor driving conditions may be suitable for upload to the driving condition database 18.

In process block 146, the connection rating determination logic 60 may determine the connection rating of the connection between the communication interface 50 of the autonomous vehicle 14 and the communication network 12. As described above, the connection rating determination logic 60 may determine the connection rating visually as a number bars (e.g., a signal strength and/or SNR), as a percentage of a maximum signal strength and/or SNR, as a numerical value indicating an actual signal strength and/or SNR, and/or via other suitable methods.

In decision block 148, the connection rating determination logic 60 may determine whether the connection rating of the connection between the communication interface 50 of the autonomous vehicle 14 and the driving condition database 18 is a high rating that would enable the autonomous vehicle 14 to upload the vehicle sensor information and/or the mobile device sensor information to the driving condition database 18 or a low rating that would limit and/or prevent the autonomous vehicle 14 from uploading the vehicle sensor information and/or the mobile device sensor information to the driving condition database 18. As described above, the connection rating determination logic 60 may determine whether the connection rating is the high rating or the low rating based on a signal strength of the connection and by comparing the signal strength to a threshold signal strength. The threshold signal strength may generally correspond to the communication interface 50 being capable and/or being able to efficiently upload the vehicle sensor information and/or the mobile device sensor information to the driving condition database 18. Based on the connection rating being the low rating (e.g., the connection rating not being high), the method 140 proceeds to process block 150. Based on the connection rating being the high rating, the method 140 proceeds to process block 152.

In process block 150, the controller 20 of the autonomous vehicle 14 may store the vehicle sensor information and/or the mobile device sensor information (e.g., the driving condition information) gathered and/or processed by the data gathering and processing logic 62 in a storage device, such as the one or more memory devices 24. The controller 20 may store the driving condition information for subsequent upload to the driving condition database 18.

After storing the gathered and/or processed vehicle sensor information and/or mobile device sensor information, the method 140 returns to process block 142 and continues gathering vehicle sensor information and/or mobile device sensor information indicative of the driving conditions. As such, the components of the autonomous vehicle network system 10 (e.g., the controller 20, the connection rating determination logic 60, and/or the data gathering and processing logic 62) may iteratively perform process block 142, process block 144, process block 146, decision block 148, and process block 150 to gather, process, and/or store the driving condition information when the autonomous vehicle is in a geographic area having a low connection rating.

In process block 152, the communication interface 50 of the autonomous vehicle 14 sends the vehicle sensor information and/or the mobile device sensor information to the driving condition database 18 via the communication network 12 based on the connection rating between the communication interface 50 and the communication network 12 being the high rating. For example, after the connection rating determination logic 60 determines that the connection rating is the high rating, the controller 20 may instruct the communication interface 50 to send the vehicle sensor information and/or the mobile device sensor information to the driving condition database 18.

In decision block 154, the controller 20 determines whether vehicle sensor information and/or mobile device sensor information is stored in a storage device (e.g., process block 150), such as the one or more memory devices 24 of the controller 20. For example, the controller 20 may check the one or more memory devices 24 to determine whether the vehicle sensor information and/or the mobile device sensor information is stored in the one or more memory devices 24 and is ready for upload to the driving condition database 18. In certain embodiments, the controller 20 may automatically have the vehicle sensor information and/or the mobile device sensor information ready for upload after being stored in the one or more memory devices 24. Based on the controller 20 determining that vehicle sensor information and/or mobile device sensor information is stored in a storage device, the method 140 proceeds to process block 156. Based on the controller 20 determining that vehicle sensor information and/or mobile device sensor information is not stored in a storage device, the method 140 proceeds/returns to process block 142.

In some embodiments, the controller 20 may determine that the data gathering and process logic 62 is still processing the vehicle sensor information and/or the mobile device sensor information, such that the vehicle sensor information and/or the mobile device sensor information is not suitable/ready for upload to the driving condition database 18 (e.g., the vehicle sensor information and/or the mobile device sensor information may be in a partially processed state). Based on the controller 20 determining that the vehicle sensor information and/or the mobile device sensor information is not suitable/ready for upload to the driving condition database 18, the method 140 proceeds/returns to process block 142.

In process block 156, the communication interface 50 of the autonomous vehicle 14 sends the stored vehicle sensor information and/or mobile device sensor information to the driving condition database 18. Thereafter, the method 140 returns to process block 142 and continues gathering vehicle sensor information and/or mobile device sensor information indicative of the driving conditions. As such, the components of the autonomous vehicle network system 10 (e.g., the controller 20, the connection rating determination logic 60, and/or the data gathering and processing logic 62) may iteratively perform process block 142, process block 144, process block 146, decision block 148, process block 152, decision block 154, and/or process block 156 to gather, process, and/or send/upload the driving condition information when the autonomous vehicle is in a geographic area having a high connection rating.

As described above, in addition to storing and communicating the vehicle sensor information and the mobile device sensor information, the vehicle sensor information and the mobile device sensor information may be used to operate the autonomous vehicle as the vehicle sensor information and the mobile device sensor information is gathered and/or processed. For example, the autonomous vehicle may be operated while and/or after such information is gathered via the vehicles sensors 40 and/or the device sensors 42 and/or after such information is processed. Such operation of the autonomous vehicle may include fully autonomous operation (e.g., independent operation without input from a user), semi-autonomous operation (e.g., operation with some input from a user), or other forms of autonomous operation. Additionally, such operation may include controlling steering, vehicle speed, signal operation (e.g., turn signal), headlights, windshield wipers, window position (e.g., side, rear, or roof windows being open, closed, or partially open), driveline operation (e.g., 2-wheel drive or 4-wheel drive), among other operations.

Figure 5:
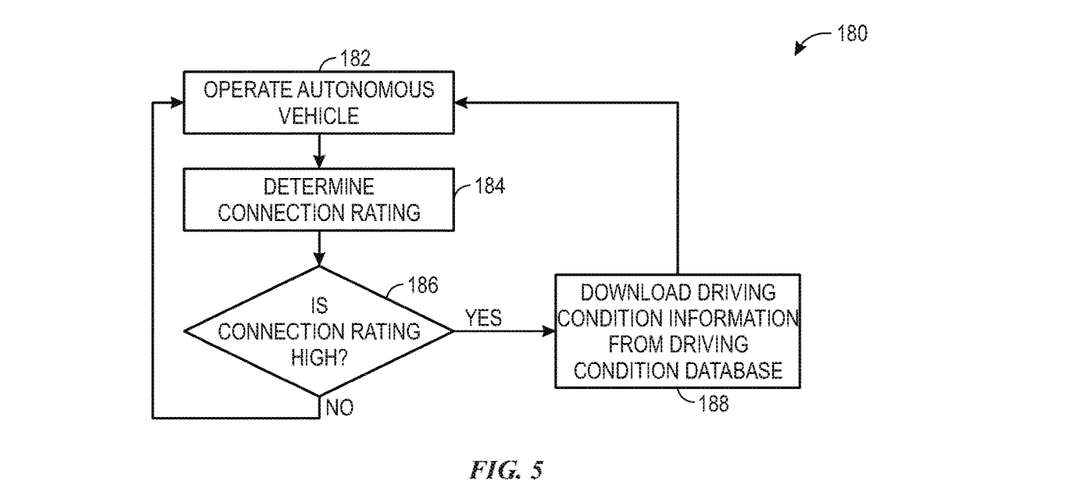
FIG. 5 is a flowchart illustrating a method for communicating driving condition information to the autonomous vehicle of FIG. 3 via the autonomous vehicle network system of FIG. 1, according to embodiments of the present disclosure.

FIG. 5 is a flowchart illustrating a method 180 for operating an autonomous vehicle and controlling the download of driving condition information based on a connection rating, according to embodiments of the present disclosure. The method 180 may be performed by any suitable device that may control components of the autonomous vehicle network system 10 of FIG. 1, such as the controller 20 of the autonomous vehicle 14, the controller 26 of the mobile device 16, the connection rating determination logic 60, and/or the data gathering and processing logic 62. While the method 180 is described using steps in a specific sequence, it should be understood that the present disclosure contemplates that the described steps may be performed in different sequences than the sequence illustrated, and certain described steps may be skipped or not performed altogether. In some embodiments, the method 180 may be implemented by executing instructions stored in a tangible, non-transitory, computer-readable medium, such as the one or more memory devices 24 and/or 30, using a processor, such as the one or more processors 22 and/or 28.

As illustrated, in process block 182, the controller 20 may operate the autonomous vehicle 14. For example, the controller 20 may operate the autonomous vehicle 14 partially or fully autonomously. Examples of autonomous operations of the autonomous vehicle 14 include autonomous steering, autonomous control of speed, autonomous control of windshield wipers, autonomous communication with the driving condition database, autonomous communication with other vehicles and/or components of an autonomous vehicle network, and other operations of that may be configured for at least partial autonomous operation/control. The controller 20 may operate the autonomous vehicle 14 based on driving conditions currently detected by the vehicle sensors and/or based on driving conditions downloaded from the driving condition database (e.g., driving conditions previously uploaded to the driving condition database by the autonomous vehicle 14, by other autonomous vehicles 14, and/or by non-autonomous vehicles).

At process block 184, the connection rating determination logic 60 may determine the connection rating of the connection between the communication interface 50 of the autonomous vehicle 14 and the communication network 12. As described above, the connection rating determination logic 60 may determine the connection rating visually as a number bars (e.g., a signal strength and/or SNR), as a percentage of a maximum signal strength and/or SNR, as a numerical value indicating an actual signal strength and/or SNR, and/or via other suitable methods.

At decision block 186, the connection rating determination logic 60 may determine whether the connection rating of the connection between the communication interface 50 of the autonomous vehicle 14 and the driving condition database 18 is a high rating that would enable the autonomous vehicle 14 to download the driving condition information from the driving condition database 18 or a low rating that would limit and/or prevent the autonomous vehicle 14 from downloading the driving condition information from the driving condition database 18. As described above, the connection rating determination logic 60 may determine whether the connection rating is the high rating or the low rating based on a signal strength of the connection and by comparing the signal strength to a threshold signal strength. The threshold signal strength may generally correspond to the communication interface 50 being capable and/or being able to efficiently upload the vehicle sensor information and/or the mobile device sensor information to the driving condition database 18. Based on the connection rating being the low rating (e.g., the connection rating not being high), the method 180 returns to process block 182, and the controller 20 continues to operate the autonomous vehicle 14. As such, the components of the autonomous vehicle network system 10 (e.g., the controller 20 and/or the connection rating determination logic 60) may iteratively perform process block 182, process block 184, and/or decision block 186 to operate the autonomous vehicle 14.

Based on the connection rating being the high rating, the method 180 proceeds to process block 188. At process block 188, the controller 20 may download the driving condition information from the driving condition database 18. For example, the controller 20 may instruct the communication interface 50 of the autonomous vehicle 14 to download new/additional driving condition information that corresponds to a geographic area in which the autonomous vehicle 14 is located and/or is expected to be located (e.g., a geographic area that autonomous vehicle 14 is traveling toward). After downloading the driving condition information from the driving condition database 18, the method 180 returns to process block 182, and the controller 20 operates the autonomous vehicle 14 based on the driving condition information downloaded in process block 188, based on previously downloaded driving condition information, and/or based on newly detected vehicle sensor information and/or mobile device sensor information indicative of the driving conditions. As such, the components of the autonomous vehicle network system 10 (e.g., the controller 20 and/or the connection rating determination logic 60) may iteratively perform process block 182, process block 184, decision block 186, and/or process block 188 to operate the autonomous vehicle 14 and to control downloading the driving condition information from the driving condition database 18.

While the embodiments set forth in the present disclosure may be susceptible to various modifications and alternative forms, specific embodiments have been shown by way of example in the drawings and have been described in detail herein. However, it should be understood that the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An autonomous vehicle comprising:
a camera configured to generate vehicle sensor information indicative of one or more first driving conditions;
a communication interface configured to communicatively couple with a vehicle bus of the autonomous vehicle and a driving condition database via a communication network, wherein the vehicle bus is configured to receive the vehicle sensor information and mobile device sensor information indicative of one or more second driving conditions from one or more mobile devices, and wherein the driving condition database is configured to store the vehicle sensor information and the mobile device sensor information; and
a controller comprising one or more processors and one or more memory devices, wherein the one or more processors are configured to execute instructions stored in the one or more memory devices to cause the one or more processors to:
determine that the one or more first driving conditions comprise shaking of a surface based on vertical movement, horizontal movement, or both, of one or more objects in an environment of the autonomous vehicle based on the vehicle sensor information;
determine a signal strength, a signal-to-noise ratio ("SNR"), or both, of a connection between the communication interface and the communication network;
in response to determining that the signal strength is below a threshold signal strength, the SNR is below a threshold SNR, or both, store the vehicle sensor information and the mobile device sensor information in a storage device of the autonomous vehicle for subsequent communication by the communication interface to the driving condition database; and
operate the autonomous vehicle based on the vehicle sensor information and the mobile device sensor information.

2. The autonomous vehicle of claim 1, wherein the one or more processors are configured to execute the instructions stored in the one or more memory devices to cause the one or more processors to, in response to determining that the signal strength is below the threshold signal strength, the SNR is below the threshold SNR, or both, instruct the communication interface to send the vehicle sensor information and the mobile device sensor information to the storage device.

3. The autonomous vehicle of claim 1, wherein the instructions stored in the one or more memory devices comprise data gathering and processing logic configured to process the vehicle sensor information and the mobile device sensor information to determine one or more assessed driving conditions.

4. The autonomous vehicle of claim 1, wherein the camera is configured to visually detect the one or more first driving conditions.

5. The autonomous vehicle of claim 1, comprising one or more radio detection and ranging ("RADAR") sensors configured to emit radio waves to detect the one or more first driving conditions.

6. The autonomous vehicle of claim 1, wherein the one or more processors are configured to execute the instructions stored in the one or more memory devices to cause the one or more processors to determine the threshold signal strength based on a type of the vehicle sensor information and the mobile device sensor information, a quantity of the vehicle sensor information and the mobile device sensor information, or both.

7. The autonomous vehicle of claim 1, comprising one or more vehicle sensors are configured to detect the one or more first driving conditions comprising one or more weather conditions, one or more roadway conditions, the one or more objects in the environment of the autonomous vehicle, one or more conditions within the autonomous vehicle, or a combination thereof.

8. The autonomous vehicle of claim 1, comprising the one or more mobile devices, wherein the one or more mobile devices comprise one or more mobile device sensors configured to detect the one or more second driving conditions.

9. The autonomous vehicle of claim 1, wherein the one or more processors are configured to execute the instructions stored in the one or more memory devices to cause the one or more processors to determine the threshold SNR based on a type of the vehicle sensor information and the mobile device sensor information, a quantity of the vehicle sensor information and the mobile device sensor information, or both.

10. The autonomous vehicle of claim 1, wherein the one or more processors are configured to execute the instructions stored in the one or more memory devices to cause the one or more processors to instruct the communication interface to send the vehicle sensor information and the mobile device sensor information to the driving condition database in response to determining that the signal strength is above the threshold signal strength, the SNR is below the threshold SNR, or both.

11. The autonomous vehicle of claim 1, wherein the threshold signal strength comprises a percentage of a maximum signal strength, the threshold SNR comprises a percentage of a maximum SNR, or both.

12. The autonomous vehicle of claim 1, the threshold signal strength comprises a first numerical value in decibel-milliwatts ("dBm"), the threshold SNR comprises a second numerical value in dBm, or both.

13. One or more tangible, non-transitory, computer-readable media, comprising instructions for detecting and transmitting driving condition information related to an autonomous vehicle that, when executed by one or more processors, cause the one or more processors to:
receive vehicle sensor information and mobile device sensor information from a driving condition database, wherein the vehicle sensor information and the mobile device sensor information are indicative of one or more stored driving conditions, and wherein the mobile device sensor information is indicative of one or more stored weather conditions;
determine a signal strength of a connection between a communication interface communicatively coupled to the autonomous vehicle and a communication network prior to entering a first geographical region based on the one or more stored driving conditions and additional mobile device sensor information, wherein the additional mobile device sensor information is indicative of a weather condition within the first geographical region corresponding to a stored weather condition of the one or more stored weather conditions;
in response to determining that the signal strength is greater than or equal to a threshold signal strength in the first geographic region, send additional vehicle sensor information and the additional mobile device sensor information to the driving condition database via the communication interface; and
in response to determining that the signal strength is below the threshold signal strength in the first geographic region, store the additional vehicle sensor information and the additional mobile device sensor information in a storage device for subsequent communication by the communication interface to the driving condition database.

14. The one or more tangible, non-transitory, computer-readable media of claim 13, wherein the instructions, when executed by the one or more processors, cause the one or more processors to determine one or more driving conditions based on the vehicle sensor information and the mobile device sensor information in response to determining that the signal strength is below the threshold signal strength.

15. The one or more tangible, non-transitory, computer-readable media of claim 13, wherein the instructions, when executed by the one or more processors, cause the one or more processors to, in response to determining that the signal strength is greater than or equal to the threshold signal strength, instruct the communication interface to download information indicative of one or more expected driving conditions corresponding to a geographic area into which the autonomous vehicle is expected to travel.

16. The one or more tangible, non-transitory, computer-readable media of claim 13, wherein the instructions, when executed by the one or more processors, cause the one or more processors to determine the threshold signal strength based on a type of the vehicle sensor information and the mobile device sensor information, a quantity of the vehicle sensor information and the mobile device sensor information, a current geographic area of the autonomous vehicle, one or more expected geographic areas of the autonomous vehicle, a type of the autonomous vehicle, one or more types of vehicle sensors configured to provide the vehicle sensor information, one or more types of device sensors configured to provide the mobile device sensor information, a quantity of the vehicle sensors, a quantity of the device sensors, or any combination thereof.

17. The one or more tangible, non-transitory, computer-readable media of claim 13, wherein the vehicle sensor information comprises a plurality of images, and wherein the instructions, when executed by the one or more processors, cause the one or more processors to determine one or more driving conditions based on one or more differences between the plurality of images.

18. The one or more tangible, non-transitory, computer-readable media of claim 13, wherein one or more driving conditions comprise the one or more stored weather conditions, one or more road conditions, one or more road markings, one or more objects disposed proximate to or along a pathway of the autonomous vehicle, one or more other vehicles, one or more structures, one or more signs, one or more municipalities, one or more natural disasters, or any combination thereof.

19. The one or more tangible, non-transitory, computer-readable media of claim 13, wherein the instructions, when executed by the one or more processors, cause the one or more processors to determine the stored one or more driving conditions, and wherein the one or more stored driving conditions comprise shaking of a surface based on vertical movement, horizontal movement, or both, of one or more objects in an environment of the autonomous vehicle, flooding of the environment based on one or more water levels, a severity of the flooding based on a rate of change of the one or more water levels, or any combination thereof.

20. A method of detecting and transmitting driving condition information related to an autonomous vehicle, comprising:
receiving driving condition information comprising stored vehicle sensor information and stored mobile device sensor information from a driving condition database, wherein the stored vehicle sensor information and the stored mobile device sensor information are indicative of one or more stored driving conditions, and wherein the stored mobile device sensor information is indicative of one or more stored weather conditions;
receiving vehicle sensor information and mobile device sensor information, wherein the vehicle sensor information and the mobile device sensor information are indicative of one or more driving conditions, and wherein the mobile device sensor information is indicative of one or more road conditions;
determining a signal-to-noise ratio ("SNR") of a connection between a communication network and a communication interface configured to communicatively couple with a vehicle bus of the autonomous vehicle prior to entering a first geographical region based on the driving condition information, the vehicle sensor information, the mobile device sensor information, or any combination thereof;
sending the vehicle sensor information and the mobile device sensor information, via the communication interface, to the driving condition database in response to determining that the SNR is greater than or equal to a threshold SNR in the first geographical region; and
in response to determining that the SNR is below the threshold SNR in the first geographical region:
processing the vehicle sensor information and the mobile device sensor information; and
storing the vehicle sensor information and the mobile device sensor information in a storage device for subsequent communication by the communication interface to the driving condition database.

* * * * *